United States Patent [19]

Henry

[11] 4,248,657
[45] Feb. 3, 1981

[54] APPARATUS FOR COVERING PANELS WITH SHEET MATERIAL

[75] Inventor: Jerry W. Henry, Rocky Face, Ga.

[73] Assignee: National Service Industries, Inc., Atlanta, Ga.

[21] Appl. No.: 69,520

[22] Filed: Aug. 23, 1979

[51] Int. Cl.$^3$ .............................................. B32B 3/04
[52] U.S. Cl. ........................................ 156/443; 11/2; 156/212; 156/213; 156/216; 156/227; 156/475; 156/476; 156/477 R; 156/477 B; 156/479; 156/480; 156/486; 156/487
[58] Field of Search ............... 156/196, 212, 213, 216, 156/227, 443, 444, 475, 476, 477 R, 477 B, 478, 479, 480, 483, 485, 486, 487, 489, 492; 11/2; 198/422, 424

[56] References Cited

U.S. PATENT DOCUMENTS

| | | | |
|---|---|---|---|
| 1,691,691 | 11/1928 | White | 156/480 |
| 1,794,521 | 3/1931 | Kirchhofer | 156/479 |
| 1,838,464 | 12/1931 | Steinmann | 156/479 |
| 1,950,550 | 3/1934 | Glass | 156/479 |
| 2,536,210 | 1/1951 | Ort et al. | 156/486 |
| 2,749,967 | 6/1956 | Bech et al. | 156/479 |
| 2,925,612 | 2/1960 | Schramm | 11/2 |
| 2,970,634 | 2/1961 | Hantscho | 156/477 B |
| 3,527,632 | 9/1970 | Holes et al. | 156/479 |
| 4,115,179 | 9/1978 | Carter | 156/444 |

Primary Examiner—Caleb Weston
Attorney, Agent, or Firm—B. P. Fishburne, Jr.

[57] ABSTRACT

A stiff rectangular panel is placed centrally on an adhesive coated rectangular sheet of covering material with marginal edge portions of the sheet extending beyond the panel edges. The panel and sheet are conveyed on a first pass through a roller press and on such pass a leading edge portion of the sheet is engaged by weighted pivoted folding plate segments which fold or turn the edge portion of the sheet upwardly and around the leading edge of the panel and down onto the top face of the panel where the tack of the adhesive holds the folded edge portion of the covering sheet temporarily in place. Immediately following this, a stationary stiff brush engages the folded edge portion of the sheet and presses it tightly against the top face of the panel while the brush bristles simultaneously tuck the opposite end portions of the folded sheet snugly against the advancing longitudinal edges of the panel. On a reverse pass through the press at a lower elevation, the opposite edge portion of the sheet is folded and tucked in the same manner, followed by two additional passes of the product through the press at successively lower levels in a direction at right angles to the first and second passes to complete the folding and tucking of the remaining adhesive coated edge portions of the covering sheet.

7 Claims, 14 Drawing Figures

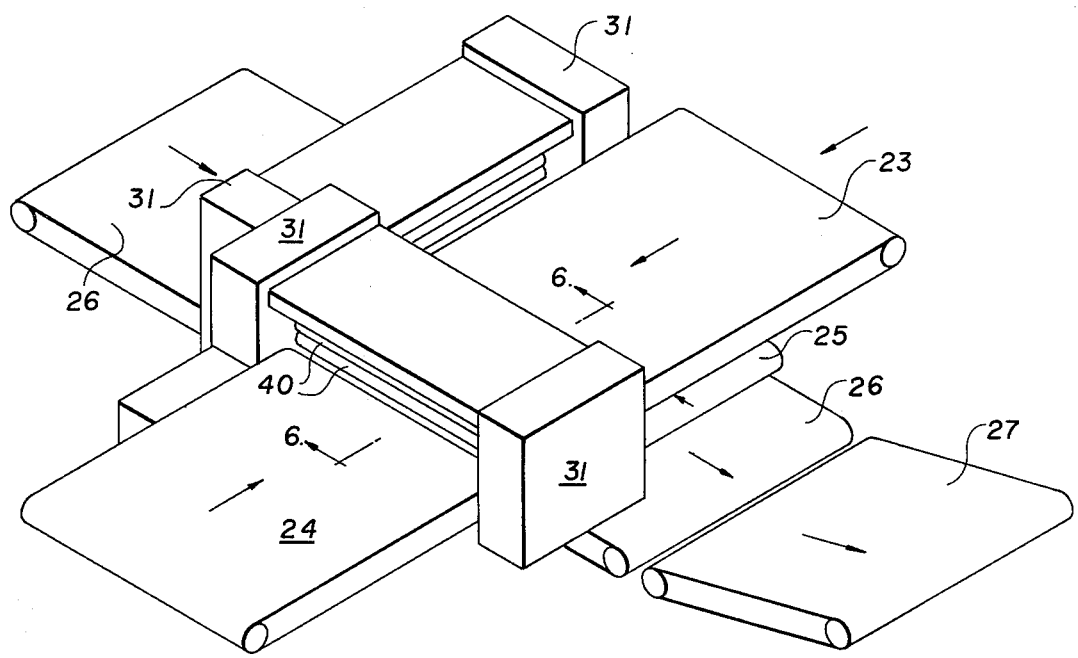
FIG. 1
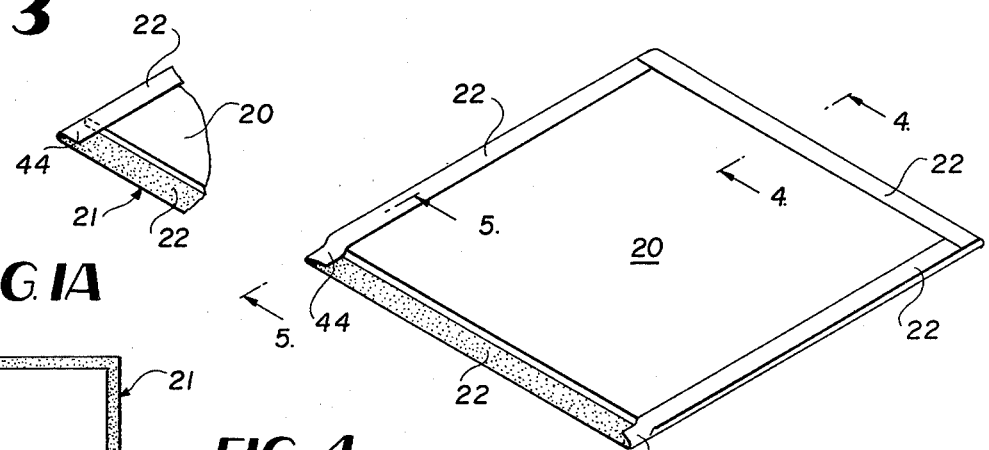
FIG. 2
FIG. 3
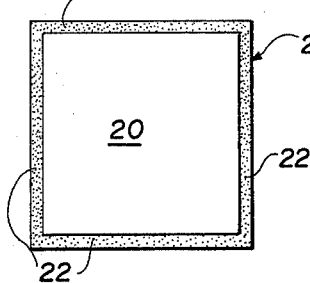
FIG. 1A
FIG. 4
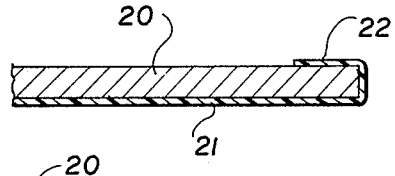
FIG. 5

APPARATUS FOR COVERING PANELS WITH SHEET MATERIAL

BACKGROUND OF THE INVENTION

The present invention is embodied in a simplified method and apparatus for covering panels of cardboard, fiberboard, or other stiff material with cloth, plastic coated paper and the like to make book covers, bound sample covers, luggage panels, artist's canvas board, and a variety of similar products. At the present time, the manufacturing of covered panels of the above types involves either hand folding of the edge portions of adhesive coated covering sheets or the use of automatic equipment which requires a large amount of set-up time. In the automatic equipment, the edges of the covering material are turned over by means of twisted belts and the corner tucks are produced by mechanical wheels. The long set-up time is required to condition the automatic machine for a large production run of a certain size panel. The set-up procedure is expensive and cannot be justified economically for a small production order or run but only for large runs. By contrast, the greatly simplified method and apparatus of the present invention is equally suitable for small and large production runs and requires no expensive set-up prior to operation and is able to process a wide range of panel thicknesses and sizes within a given size limit of the machine.

The apparatus of the invention is fast in operation and has the ability to compensate for slight deviations in the path of travel of panels and covering sheet material through the machine or press. This compensating ability is obtained through the use of independently hinged weighted cover material turning or folding plate segments held on a common shaft in the press at each successive level of the press.

The corner tucking wheels of the more complicated prior art machines are entirely dispensed with by the use of simple stiff brushes at each level of the press which serve the dual purpose of pressing down the folded over edge portions of the covering sheet and neatly tucking in the opposite ends of each folded over portion in snug relationship to the advancing parallel edges of the panel.

The following prior art United States patents of some general interest relative to the present invention are made of record herein under 37 C.F.R. 1.56:

| | |
|---|---|
| 1,691,691 | 1,950,550 |
| 1,794,521 | 2,749,967 |
| 1,838,464 | 2,925,612 |
| 4,115,149. | |

BRIEF DESCRIPTION OF THE DRAWINGS

FIG. 1 is a partly schematic perspective view of apparatus employed in the practice of the method.

FIG. 1a is a reduced size plan view of a panel centered on an adhesive coated cover sheet prior to folding and tucking operations.

FIG. 2 is a perspective view of a covered panel prior to the final folding of one edge portion of the cover sheet.

FIG. 3 is a fragmentary perspective view of one corner portion of a panel and cover sheet prior to the corner tucking of a folded over edge portion of the cover sheet.

FIG. 4 is an enlarged vertical section taken on line 4—4 of FIG. 2.

FIG. 5 is a similar section taken on line 5—5 of FIG. 2.

DETAILED DESCRIPTION

Figure 6:
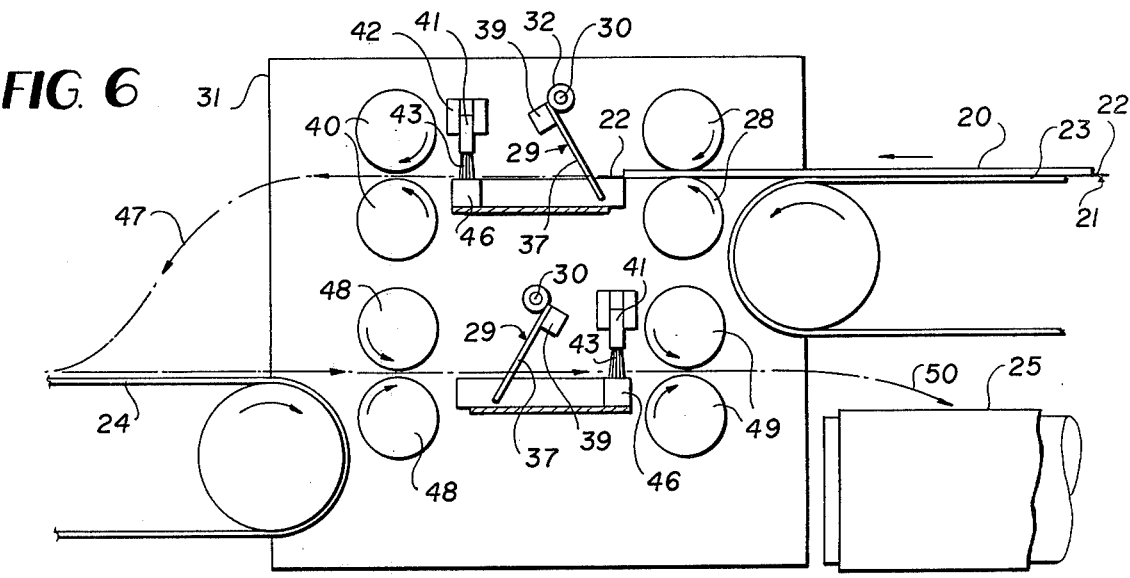
FIG. 6 is an enlarged fragmentary partly schematic section taken through the apparatus on line 6—6 of FIG. 1.

Referring to the drawings in detail wherein like numerals designate like parts, a precut rectangular panel 20, FIGS. 1a, of cardboard or the like, is pressed centrally onto the adhesive coated face of a rectangular cover sheet 21 having equal width projecting marginal edge portions or strips 22 on all sides of the panel. The cover sheet 21 may be cloth, plastics material or coated paper having a suitable adhesive applied to one face thereof.

The product as shown in FIG. 1a is placed on the upper level conveyor 23 of a four level roller press shown in its entirety in FIG. 1. FIG. 6 of the drawings shows the first two levels of the press including the conveyor 23 and a next lowermost level conveyor 24 where the product travels in a reverse direction through the press. A third level conveyor of the press is indicated at 25, traveling on a path at right angles to the conveyors 23 and 24, and a final lowermost level press conveyor 26 delivers the completed product to a take-off conveyor 27, FIG. 1. The edge folding and corner tucking components of the apparatus forming the heart of the invention are the same for each of the four levels or passes of the apparatus and the press rollers and their arrangement are the same at each level of the apparatus; therefore, a description of the apparatus at one level of the press will suffice to describe the complete press at all levels thereof.

Referring to FIG. 6, the united elements 20 and 21 are advanced by the conveyor 23 to the nip of a first pair of press rolls 28 which tightly press the body portion of the sheet 21 against the bottom of the stiff panel 20. As the advancement of the product continues, the leading edge portion or strip 22 of the cover sheet 21 contacts the rear side of an inclined pivotally mounted folding plate assembly 29, the details of which are shown in FIGS. 11 and 12.

The assembly 29 comprises a fixed transverse horizontal support shaft 30 whose ends are suitably supported on press end frames 31. Rotatably mounted in spaced relation on the shaft 30 are a plurality of equal length sleeves 32 preferably equipped near their ends with internal bushings 33 which bear directly on the shaft 30. The sleeves 32 are separated on the shaft 30 by spacing collars 34 surrounding the shaft 30 and fixed thereto by cap screws 35 which also serve as stop elements to limit rotation of the sleeves 32 in one direction, FIG. 12.

Figure 12:
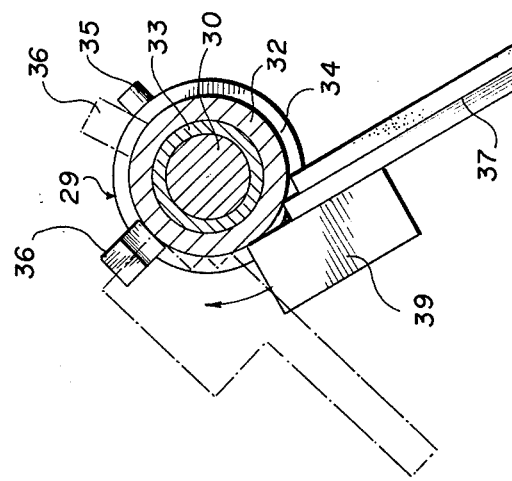
FIG. 12 is an enlarged transverse vertical section taken on line 12—12 of FIG. 11.
Figure 10:
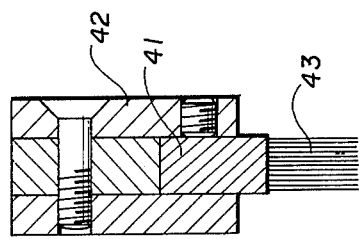
FIG. 10 is a transverse vertical section taken on line 10—10 of FIG. 9.
Figure 11:
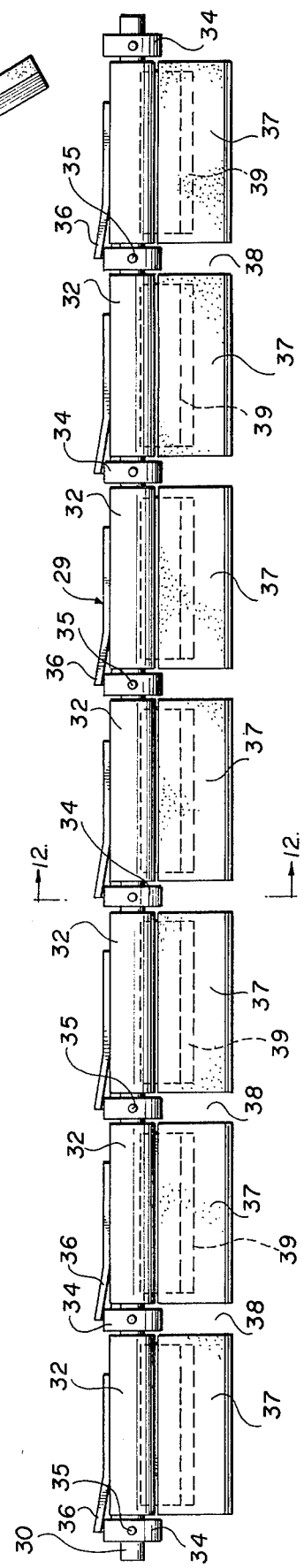
FIG. 11 is a side elevation of a segmental edge folding plate assembly.

Attached to the sleeves 32 externally are stop bars 36 which are bent outwardly as shown in FIG. 11 to clear the collars 34 but are adapted to strike the heads of cap screws 35 to limit rotation of the sleeves 32, as shown in FIG. 12.

Attached fixedly to each rotary sleeve 32 is a plate segment 37 or finger extending for the full length of its supporting sleeve and separated from the adjacent plate sections by small gaps 38. On its forward side, each plate segment 37 has a weight bar 39 welded or otherwise fixed thereto and disposed eccentrically to the axis of shaft 30 and rotational sleeve 32. The arrangement is such that each plate segment 37 under the influence of gravity will normally assume the inclined position shown in FIG. 6 and in FIG. 12 wherein the segments slope upwardly and away from the oncoming panel 20 and cover sheet edge portion 22, FIG. 6.

Figure 7:
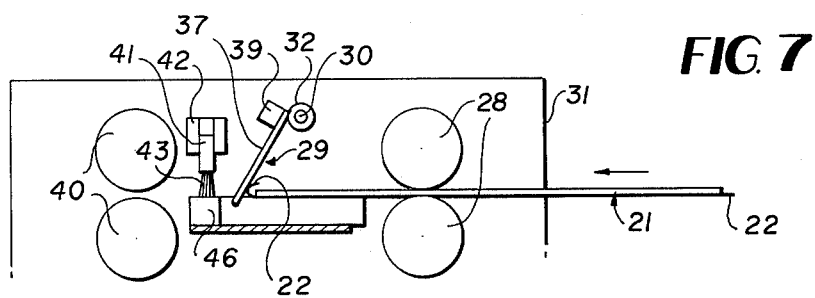
FIG. 7 is a fragmentary cross section showing a first step in the folding and tucking method during a first pass of the product through the uppermost level of the machine or press.

Upon encountering the advancing sheet edge portion 22, the inclined freely swingable plate segments 37 will begin to deflect the sheet portion 22 upwardly while the plate assembly 29 begins to swing clockwise toward the position shown in FIG. 7. The continuing action of the weighted independent plate segments 37 on the sheet edge portion 22 progressively curls and folds the portion 22 around the leading edge of the panel 20 and finally up over the top face of the panel 20 in FIG. 8 when the plate segments 37 have reached the limits of their clockwise rotation due to contact of the stop bars 36 with the stationary cap screws 35.

Figure 8:
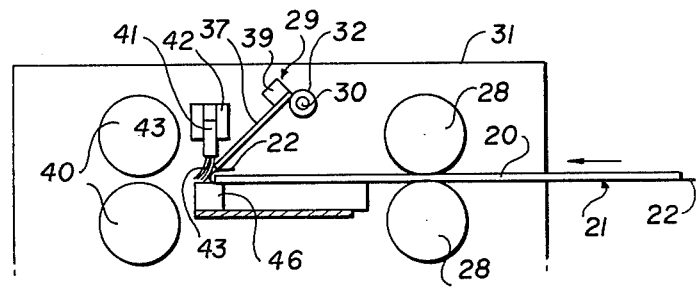
FIG. 8 is a view similar to FIG. 7 showing a further step of the method.

When the positions of the elements in FIG. 8 are reached in the advancement of the panel 22, the inclined plate segments 37 being unable to rotate further exert positive pressure on the folded-over sheet edge portion 22 to press it against the top face of panel 22, where the tack of the adhesive on the portion 22 will secure it to the panel.

Closely following the above action of the plate segments 37 in FIG. 8, the product advances toward a second set of press rolls 40 spaced downstream from the rolls 28, as shown in the drawings. Slightly upstream from the press rolls 40 and immediately beyond the clockwise rotation limit of plate segments 37, FIG. 8, a fixed transverse brush head 41 held within a fixed holder 42 has stiff depending bristles 43 which extend entirely across the frontal edge of the oncoming panel 20 and folded cover sheet edge portion 22.

Upon encountering the stiff bristles 43 just as the folded portion 22 is passing out from under the weighted plate segments 37, the bristles 43 will yield as they ride over the leading edge of panel 20, and then they will exert an even and fairly heavy downward pressure on the sheet portion 22 to complete the adherence thereof to the top face of the panel 20 entirely across the width of the same.

Figure 9:
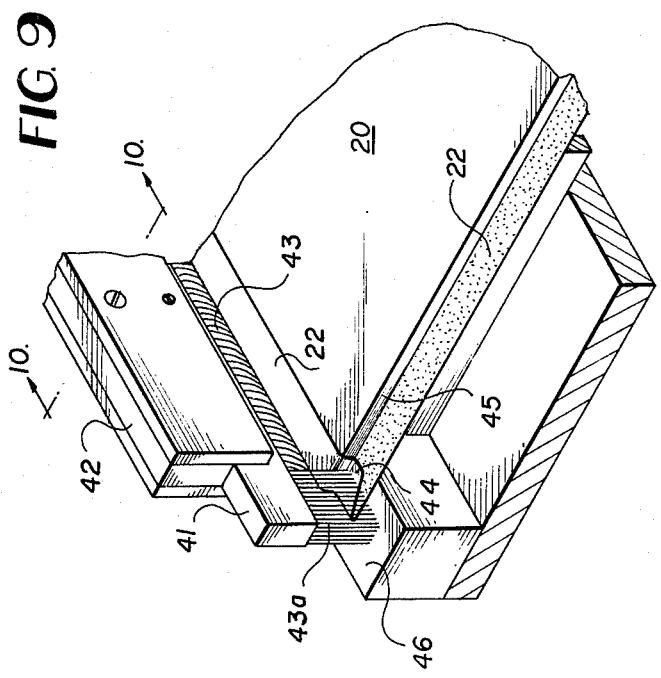
FIG. 9 is an enlarged fragmentary view, partly in section, showing the stiff brush for pressing and tucking each folded edge portion of the cover sheet.

Simultaneously with this firm pressure exerted by the bristles 43 on the folded portion 22 of the covering sheet, the opposite end portions of the brush, FIG. 9, through its endmost bristles 43a, will tuck the leading corner end pieces 44 of the covering sheet down tightly against the parallel longitudinal edges 45 of the panel 20 and will also press the end pieces 44 down onto the advancing longitudinal strips or portions 22 until these parts are firmly adhered together. Thus, the brush at one time in the process accomplishes two important things in smoothing and pressing down each edge portion or strip 22 across the entire width of the advancing panel and tucking down the end pieces 44 which lie at the corners of the completed product. Beneath the brush bristles 43a, FIG. 9, there is a back-up surface or block 46 to offer resistance to the downward pressure exerted by the brush.

Figure 8A:
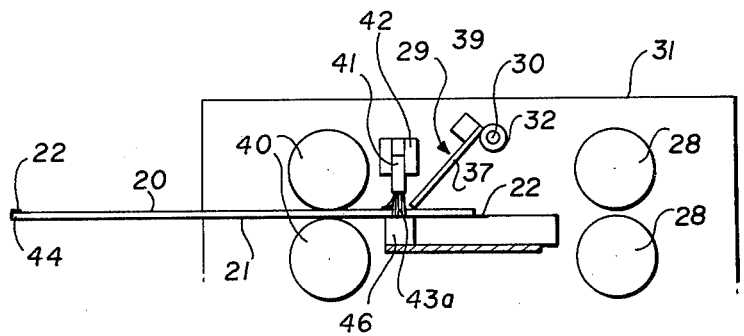
FIG. 8a is another view similar to FIGS. 7 and 8 showing the completion of the edge folding and tucking method in the first pass of the product through the press.

After passing under the stationary brush, FIG. 8a, the panel passes through the nip of the second pair of press rolls 40 and after emergence from these second rolls, the product unit falls by gravity onto the reversely traveling next lower level conveyor 24 as indicated by the directional arrow 47 in FIG. 6. On the second and reverse pass through the roller press shown in FIG. 6, the previously trailing unfolded edge portion 22 of the covering sheet 21 will now be forwardmost and will be acted on by a first set of press rolls 48, and then by the plate segments 37 of another folding plate assembly 29 set up in a reverse manner on another support shaft 30, and finally by another brush 41 and a second set of press rolls 49 in exactly the same sequence described in connection with FIGS. 6 through 8a on the first pass of the product through the machine or press.

It should be explained that the purpose and advantage of using segmental folding plates 37 rather than one continuous folding plate is to impart an ability to the folding mechanism to compensate for any slight misalignment of panels 20 passing through the press with their leading edges somewhat out of parallelism with the transverse axis of the shaft 30. When this occurs, the individual folding plate segments 37 can self-adjust and act on the edge portion 22 of the covering sheet in proper sequence to produce the desired folding and pressing action for each edge portion 22. The rolls 28–40 and 48–49, etc. provided at each level of the machine assure a positive guidance and feeding of the panel 20 at the critical times when it is being acted on by the folding assemblies 29 and the stiff brushes.

After completion of the second and reverse pass of the product through the press, FIG. 6, the product drops onto the next lowermost conveyor 25 as shown by the directional arrow 50. At this time, two of the edge portions or strips 22 have been folded over the adjacent edges of the panel 20 and pressed firmly against its top face and the end or corner portions 44 have been tucked down and adhered in the manner described and shown in FIG. 9 for both of the processed edge portions 22. The product will now be traveling on a third pass in a direction at right angles to the direction of the first two passes through the press, FIG. 1, and on the third pass will be acted upon in the described manner by another weighted folding assembly 29 and brush 41 mounted between two more pairs of press rolls, not shown. This will complete the folding over, pressing and corner tucking of a third of the four edge portions 22 of the covering sheet 21, leaving only one more edge portion 22 to be processed in the same manner during a fourth and final reverse pass through the press on the lowest level conveyor 26, FIG. 1, below the conveyor 25 and also at right angles to conveyors 23 and 24. During this fourth and final pass of the product through the press, the fourth edge portion 22 which is now the leading edge portion will be acted on in the manner already described by the same apparatus components shown at the first two levels of the machine in FIG. 6. This completes the covering of the panel 20 by the covering sheet 21 with all four of its marginal edge portions 22 neatly folded around the four edges of the panel and mitre tucked at all four corners of the panel by the means and in the manner shown in FIG. 9.

The process is continuous in terms of covering a continuous procession of panels 20 fed into the press, it is rapid and efficient and requires no expensive set-up time for the press, as explained previously. The press can handle variations in panel size and thickness within a rather wide range. The invention, therefore, has the ability to handle small and large production orders with economy in contrast to the prior art. The advantage of the invention over the known prior art should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a panel covering apparatus, a panel infeed conveyor, a first pair of panel feed rolls near the discharge end of the infeed conveyor, a free hanging pivotal cross axis weighted folding plate assembly in the path of movement of panels being advanced by said first pair of feed rolls and operable to lift and fold a leading flexible edge portion of panel sheet covering material around the leading edge of the panel and also operable to press such portion of covering material down onto the top face of the moving panel by a dragging action of the free swinging plate assembly over the leading edge of the panel and rearwardly along the top face thereof as the plate assembly swings gradually from a first inclined position to a second inclined position on opposite sides of a vertical plane through the suspension axis of the plate assembly under influence of the moving panel, a stationary brush extending across the movement path of the panel downstream of the plate assembly and having stiff depending bristles operable to press and smooth said leading edge portion and to simultaneously tuck the opposite ends thereof against the side edges of the panel, and a second pair of panel feed rolls downstream from said brush to pull the panel beyond the brush for passage by gravity to a second level of the apparatus for further processing.

2. The apparatus of claim 1, and said folding plate assembly comprising a plurality of independently hinged freely swingable weighted folding plate segments which collectively span the entire width of an advancing panel.

3. Apparatus for covering a rectangular panel with an adhesive coated sheet material and with the panel centered on the material so that edge portions of the material extend beyond the edges of the panel, the apparatus comprising at a first elevation thereof a first conveyor for the panel, a segmental inclined pivotally hanging weighted folding plate assembly in the path of movement of the panel and engaging a first leading edge portion of said sheet material and folding it upwardly and around a first leading edge of the panel and over the top face of the panel and applying downward pressure to the folded first leading edge portion while said plate assembly simultaneously swings in the direction of movement of the panel and rides over the top face thereof, a stationary pressing, smoothing and tuck forming brush positioned downstream of said folding plate assembly and having depending bristles acting on the top of the folded first leading edge portion and simultaneously acting on opposite ends of such leading edge portion to tuck such ends closely against the side edges of the panel, the apparatus additionally comprising at a second elevation a second conveyor for the panel moving reversely of the first conveyor and also comprising at the second elevation in reverse disposition said folding plate assembly and brush and operable to fold, press, smooth and tuck a second leading edge portion of said sheet material, and the apparatus comprising at third and fourth elevations thereof reversely moving third and fourth conveyors for the panel having movement paths at right angles to the first and second conveyors and additional folding plate assemblies and brushes to fold, press, smooth and tuck third and fourth leading edge portions of said sheet material.

4. The apparatus of claim 3, and said first, second, third and fourth conveyors comprising level belt conveyors and said first, second, third and fourth elevations being descending elevations.

5. The apparatus of claim 3, and pairs of panel feed rolls upstream and downstream of said folding plate assemblies and brushes at each elevation of the apparatus.

6. The apparatus of claim 3, and each brush comprising a brush head, a channel holder for the brush head, and equal length multiple row stiff bristles, said brush extending entirely across the panel and sheet material and somewhat beyond the side edges thereof.

7. The apparatus of claim 3, and each folding plate assembly comprising a support shaft, plural equal length rotational sleeves on the support shaft, folding plate segments fixed on said sleeves and extending generally tangentially thereof, weighting bars attached to said plate segments in eccentric relationship to the axis of said support shaft, collars fixed on said support shaft near the ends of said sleeves and serving to separate the sleeves and having radially projecting stops, and coacting stop elements fixed to said sleeves and turning therewith around the axis of the support shaft and engaging said radially projecting stops to limit rotation of the sleeves and plate segments in one direction under pushing influence of panels passing through the apparatus, the plate segments normally assuming inclined free hanging positions across the paths of movement of panels passing through the apparatus due to gravity.

* * * * *